United States Patent
Hagler-Gray et al.

(10) Patent No.: US 7,695,063 B2
(45) Date of Patent: Apr. 13, 2010

(54) CHILD CAR SEAT PORTABLE FAN ASSEMBLY

(76) Inventors: Terrie Hagler-Gray, 10320 Vixen La., Huntersville, NC (US) 28078; Lee Gray, 3810-2 Selwyn Farms La., Charlotte, NC (US) 28209

( * ) Notice: Subject to any disclaimer, the term of this patent is extended or adjusted under 35 U.S.C. 154(b) by 0 days.

(21) Appl. No.: 11/859,369

(22) Filed: Sep. 21, 2007

(65) Prior Publication Data
US 2008/0073947 A1 Mar. 27, 2008

Related U.S. Application Data

(60) Provisional application No. 60/846,239, filed on Sep. 21, 2006.

(51) Int. Cl.
*A47C 7/62* (2006.01)
*B60R 7/00* (2006.01)
(52) U.S. Cl. .................. 297/188.14; 224/275
(58) Field of Classification Search ............... 297/185, 297/180.14, 217.3, 188.2; 34/90, 241; 415/211.2, 415/213.1; 261/116; 296/77.1; 62/236; 239/153; 416/63; 417/234; 224/585; 281/34; 124/64
See application file for complete search history.

(56) References Cited

U.S. PATENT DOCUMENTS

| | | | | |
|---|---|---|---|---|
| 3,558,243 A * | 1/1971 | Trapp | ........................ | 417/411 |
| 4,850,804 A * | 7/1989 | Huang | ........................ | 416/246 |
| 5,146,765 A * | 9/1992 | Waters | ........................ | 62/259.3 |
| 5,468,124 A * | 11/1995 | Chen | ........................ | 416/63 |
| 5,837,167 A * | 11/1998 | Lederer | ........................ | 261/28 |
| 6,216,961 B1 * | 4/2001 | Utter et al. | ........................ | 239/153 |
| 6,277,023 B1 * | 8/2001 | Schwarz | ........................ | 454/120 |
| D464,420 S * | 10/2002 | Tolar | ........................ | D23/382 |
| 6,666,647 B1 * | 12/2003 | Trask | ........................ | 415/211.2 |
| 6,763,986 B2 * | 7/2004 | Santos et al. | ........................ | 224/585 |
| 6,935,944 B2 * | 8/2005 | Bigelow, Jr. | ........................ | 454/143 |
| 7,024,876 B1 * | 4/2006 | Kishek | ........................ | 62/236 |
| 2002/0074199 A1 * | 6/2002 | Albritton | ........................ | 190/107 |
| 2002/0074674 A1 * | 6/2002 | Keeney | ........................ | 261/116 |
| 2004/0088877 A1 * | 5/2004 | Gilmer | ........................ | 34/90 |
| 2004/0197199 A1 * | 10/2004 | Cheng | ........................ | 417/234 |
| 2004/0202858 A1 * | 10/2004 | Lee | ........................ | 428/332 |

(Continued)

*Primary Examiner*—David Dunn
*Assistant Examiner*—James Alex
(74) *Attorney, Agent, or Firm*—Clements Bernard PLLC; Christopher L. Bernard; Lawrence A. Baratta, Jr.

(57) ABSTRACT

A portable fan assembly adapted for seatmant on a vehicular surface in a spaced apart relationship to a child car seat, comprising a front portion, a back portion, two side portions, a top portion, and a bottom portion. An interior void is positioned centrally within the assembly, extending from the front portion to the back portion. A fan unit having a housing that is positioned within the interior void. The housing includes a central hub and at least a pair of fan blades that are mounted to the hub. The hub is rotationally connected by an elongated shaft to a fan motor configured to be operative for rotating the fan blades for directing air through the interior void. The front portion, back portion, two side portions, the top portion, and the bottom portion are substantially padded for providing a cushioning effect that prevents injury to an child situated in close proximity to the assembly, and at least one attachment strap configured to securely position the assembly to a vehicular seat.

17 Claims, 3 Drawing Sheets

U.S. PATENT DOCUMENTS

2005/0056026 A1* 3/2005 Sundhar .................. 62/3.3
2006/0001256 A1* 1/2006 Morgan .................. 281/34
2006/0082183 A1* 4/2006 Hudson .................. 296/77.1
2006/0273195 A1* 12/2006 Junkel .................. 239/222.11
2007/0228099 A1* 10/2007 Beda .................. 224/666
2008/0101928 A1* 5/2008 Chen .................. 415/213.1

* cited by examiner

CHILD CAR SEAT PORTABLE FAN ASSEMBLY

CROSS-REFERENCE TO RELATED APPLICATION

The present non-provisional patent application claims the benefit of U.S. Provisional Patent Application No. 60/846,239 entitled "INFANT CAR SEAT FAN ASSEMBLY," filed Sep. 21, 2006, which is herein incorporated in full by reference.

FIELD OF THE INVENTION

The present invention relates generally to a child car seat fan assembly, and more particularly to a portable fan assembly to be used in conjunction with a child car seat that is safe and suitable to be utilized in close proximity to a child.

BACKGROUND OF THE INVENTION

When a child under a certain age, as determined by law, travels in a motor vehicle, the child is required to be securely fastened within a child safety seat to prevent injury in the unfortunate, but occasional, vehicle accident. Child safety seats are designed, and in most instances required by law, to be positioned within the back seat of a motor vehicle. As a result, the child is substantially blocked from any direct air flow supplied by the vehicle's ventilation system by the seat backs of the front seats. In other instances the occupants of the front seat might not desire air flow, causing the air in the back of the car to become stagnated and undesirable for a child. Having a fan running near a sleeping infant was associated with a 72 percent decrease in the risk of sudden infant death syndrome, or SIDS, researchers reported in the Archives of Pediatrics and Adolescent Medicine. The study suggests that the fan use might reduce the risk for SIDS by decreasing rebreathing and increasing dispersion of carbon dioxide in the infant's airway. This may be advantageous for infants sleeping while traveling in a car as well. Furthermore, many children can become preoccupied by a rotating object, such as a fan, resulting in a more enjoyable ride for the older occupants of the vehicle.

BRIEF SUMMARY OF THE INVENTION

The present invention utilizes a fan that is incorporated into a child safety assembly, having multiple components that are attractive and, most importantly, safe for a child traveling in a motor vehicle. The assembly is designed for seatmant on either the front of the rear seat of a vehicle or the back of the front passenger seat. The assembly is securely attached to the seat by the use of at least one attachment strap that fits around the seat, preferably the head rest of the seat. The assembly is substantially padded with a flame retardant material preventing injury to the child in the unfortunate occurrence of a wreck, or in the more unlikely scenario of the assembly becoming disengaged with the car seat and striking the child. An interior void is located centrally within the assembly, having a fan unit positioned within the interior void. The fan unit is composed of a housing with fan blades that are designed to direct air outward towards a child positioned in front of the fan. A protective grill is located above the housing for prohibiting the intrusion of items into the fan blades, such a child's fingers.

In addition thereto, the front portion of the fan assembly includes at least one transparent picture pocket for positioning a picture of the child's loved one therein, providing a certain level of comfort to the child that is evoked through the visual senses of recognizing a loved one within such close proximity. At least one fabric pocket is located on the front portion of the assembly for providing a convenient storage pocket for child related items.

These and other objects of the present invention are achieved in the preferred embodiments disclosed below by providing a portable fan assembly adapted for seatmant on a vehicular surface in a spaced apart relationship with a child car seat, comprising a front portion, a back portion, two side portions, a top portion, and a bottom portion. An interior void is positioned centrally within the assembly, extending from the front portion to the back portion. A fan unit having a housing is positioned within the interior void, the fan housing includes a central hub and at least a pair of fan blades that are mounted to the hub. The hub is rotationally connected by an elongated shaft to a fan motor configured to be operative and to rotate the fan blades, for directing air through the interior void. The front portion, back portion, two side portions, the top portion, and the bottom portion are substantially padded for providing a cushioning effect that prevents injury to a child situated in a spaced apart relationship with the assembly, and at least one attachment strap configured to securely position the assembly to a vehicular seat.

According to one preferred embodiment of the invention, the portable fan assembly includes a reflective surface positioned on the front portion of the assembly so as to reflect a view to a viewer.

According to one preferred embodiment of the invention, the portable fan assembly includes at least one substantially transparent holder having four sides, wherein three of the sides are securely attached to the front portion of the assembly defining a top loading pocket therein for the insertion of a picture.

According to another preferred embodiment of the invention, the portable fan assembly includes at least one storage holder having four sides, wherein three of the sides are securely attached to the front portion of the assembly defining a pocket therein for storage of child related items.

According to another preferred embodiment of the invention, the portable fan assembly includes a flap composed of a fabric like material that is attached to the bottom portion of the assembly and extending substantially below the planar level of the assembly.

According to yet another preferred embodiment of the invention, wherein the portable fan assembly utilizes flame retardant materials.

According to yet another preferred embodiment of the invention, the portable fan assembly includes rechargeable batteries to supply power to the fan.

According to yet another preferred embodiment of the invention, the portable fan assembly includes an electrical cord to provide power to the fan unit.

According to yet another preferred embodiment of the invention, the portable fan assembly adapted for seatmant on a vehicular surface in a spaced apart relationship with a child safety seat, comprising a front portion, a back portion, two side portions, a top portion, and a bottom portion. An interior void is positioned centrally within the assembly, extending from the front portion to the back portion. A fan unit having a housing is positioned within the interior void, and the fan housing includes a central hub and at least a pair of fan blades mounted to the hub. The central hub is rotationally connected by an elongated shaft to a fan motor that is configured to be operative and to rotate the fan blades for directing air through the interior void. The front portion, back portion, two side portions, the top portion, and the bottom portion are substantially padded for providing a cushioning effect that prevents injury to a child situated in close proximity to the assembly. A protective grill is located about the housing for prohibiting the intrusion of items into the fan blades, such as a child's fingers. At least one attachment strap is configured to securely position the assembly to a vehicular seat; and a decorative design is incorporated into the front portion of the assembly for increasing the aesthetic appeal of the assembly.

According to yet another preferred embodiment of the invention, the portable fan assembly adapted for seatmant on a vehicular surface, comprising a front portion, a back portion, two side portions, a top portion, and a bottom portion. An interior void positioned centrally within the assembly, extending from the front portion to the back portion. A fan unit having a housing positioned within the interior void that is substantially flush with the exterior of the front portion and back portion. The housing includes a central hub and at least a pair of fan blades mounted to the hub, wherein the hub is rotationally connected by an elongated shaft to a fan motor that is configured to be operative so as to rotate the fan blades to provide rotation movement of the fan blades for directing air through the interior void. The fan blades are composed of a resilient, flexible material for preventing injury to an item or body aperture that comes in contact with the fan blades during rotational movement. The front portion, back portion, two side portions, the top portion, and the bottom portion are substantially padded with flame resistant materials for providing a safe and cushioning effect that prevents injury to a child situated in close proximity to the assembly. At least one attachment strap configured to securely position the assembly to a vehicular seat, and a decorative design incorporated into the front portion of the assembly for increasing the aesthetic appeal of the assembly.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
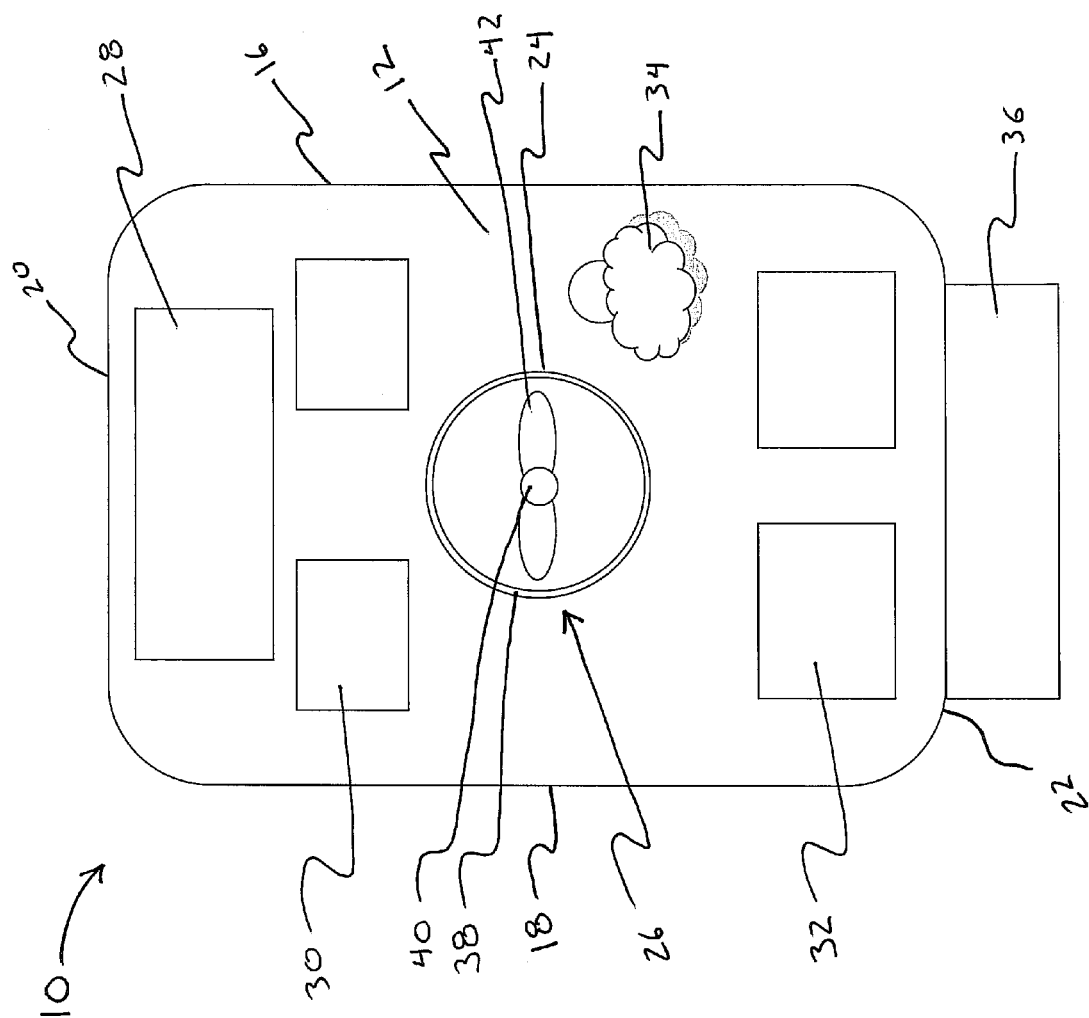
FIG. 1 is a perspective view of the front of the portable fan assembly.
Figure 3:
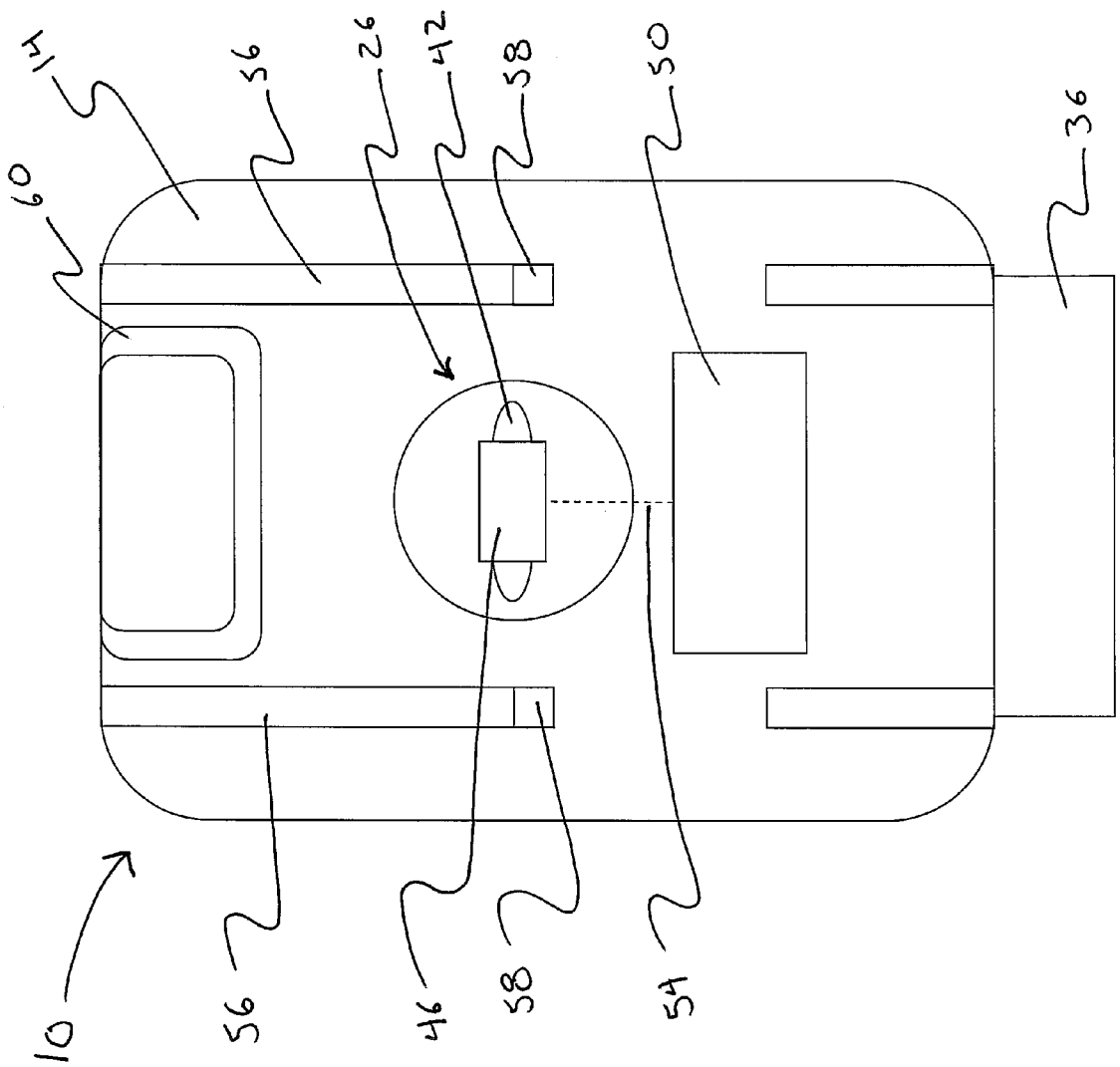
FIG. 3 is a perspective view of the rear of the portable fan assembly.

Referring now specifically to the drawings, an exemplary portable fan assembly is illustrated in FIG. 1 and is shown generally at reference numeral 10. As illustrated, the assembly 10 has a front portion 12, a back portion 14 (as illustrated in FIG. 3), two side portions 16 and 18, a top portion 20, and a bottom portion 22. An interior void 24 is centrally located within the front portion 12 that houses a fan unit 26. The fan unit 26 preferably has a low profile which is substantially flush with the top portion 20 and back portion 22 of the assembly 10 and extending into the interior void 24.

Optionally, the front portion 12 of the assembly 10 may include a reflective surface 28, such as a mirror, that is fixedly attached to the uppermost area of the front portion 12 of the assembly 10. The purpose of the reflective surface 28 is to allow the operator of a motor vehicle to clearly view the child sitting in front of the assembly 10. Preferably, the reflective surface 28 is slightly convex. In order for the driver of a vehicle to view the child with the use of the reflective surface 28, a viewing relationship must be established with the proper placement of the assembly 10. The driver, positioned in the driver's seat of the vehicle, looks into the rear view mirror of the vehicle establishing the first field of view, whereby the line of sight from the rear view mirror to the reflective surface 28 establishes the second field of view. The third field of view is established by the reflective surface 28, that is preferably convex so as to provide a vertical viewing range, and the child that the driver is intending to view. These three field of views, collectively compose the viewing relationship that allows the driver to view the child during operation of the vehicle.

At least on picture holder 30 is positioned on the front portion 12 of the assembly 10 that is made from a transparent material, such as plastic. Three sides of the transparent material are securely attached to the front portion 12, defining a top loading picture holder 30 therein. The picture holder 30 is intended to secure the photograph of a loved one that the child is familiar with and has a close bond. It is believed that the sight of a loved one by the child, while the child is securely fastened within a child seat that is in a spaced apart relationship without intimate contact with a loved one, provides a sense comfort, thereby producing a calming effect upon the child that is beneficial to all occupants of the car. As illustrated in FIG. 1, two picture holders 30 are located on the upper most area below the reflective surface 28 of the front portion 12. This placement is preferable, since it is in the direct line of sight of the child. However, this placement location is not intended to be limiting, and the picture holder 30 can be positioned at any location on the front portion 12 that is advantageous to the user.

In addition thereto, a storage pocket 32 is positioned on the front portion 12 of the assembly 10 that is preferably made from a tough, durable fabric. Three sides of the fabric are securely attached to the front portion 12, defining a top loading storage pocket 32 therein. The storage pocket 32 can be utilized to effectively store a child's necessary items. The storage pocket 32, can be made of, but not limited to, cotton, denim, polyester, micro fiber, acrylic, or ultra suede. As illustrated in FIG. 1, two storage pockets 32 are located on the lower most area of the front portion 12 of the assembly 10. This placement is preferable, since it is below the direct line of site of the child that is reserved for the picture holder 30. However, this placement location is not intended to be limiting, and the storage pocket 32 can be positioned at any location on the front portion 12 that is advantageous to the user.

The front portion 12 of the assembly 10 may also include a graphical design 34 that is aesthetically appealing to the user. The graphical design 34 can be used as a selling point that appeals to a certain section of the ultimate end user, compelling these end users to purchase the assembly 10. The graphical design 34 can include, but is not limited to, a college logo, a holiday occasion, a cartoon figure, a recognizable child star, or various and assundry aesthetically appealing designs and colors.

An optional flap 36 may be attached to either the lower area of the front portion 12 or back portion 14, or the bottom portion 22 of the assembly 10. The flap is composed of a tough, durable fabric that is of an appropriate length, enabling the flap 36 to be spread out over the rear vehicle seat before placement of the child seat. The purpose of the flap 36 is to protect the seat from any harm that may be caused from the placement of the child seat thereon, and to protect the seat from any liquid spills or food particles caused by the child. The flap 36 can be made of, but not limited to, cotton, denim, polyester, micro fiber, acrylic, or ultra suede, and include various commercially available stain guards and/or water repellants.

Figure 2:
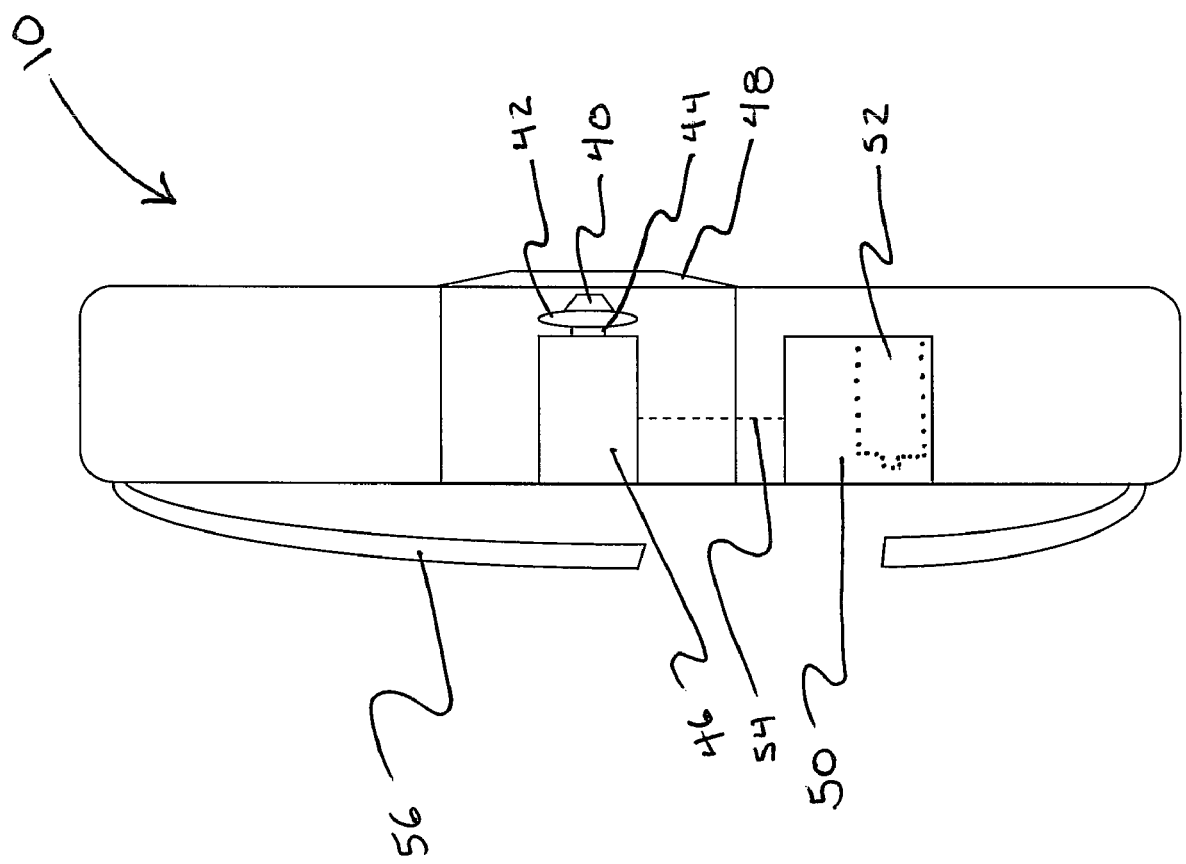
FIG. 2 is a side view of the portable fan assembly.

As illustrated in FIG. 2, the fan unit 26 comprises a housing 38 that is positioned within the interior void 24. The housing 38 includes a central hub 40 and at least two fan blades 42 mounted to the hub 40. The hub 40 and fan blades 42 are rotationally connected by an elongated shaft 44 to the fan motor 46. A protective gill 48 is located above the housing 38 for prohibiting the intrusion of items into the fan blades 42, such as a child's fingers. The fan blades 42, can be composed of a resilient, flexible material, such as a plastic, that would prevent injury to items or a child's fingers should they be placed in the fan housing during operation of the fan blades, possibly negating the need for the protective grill 48.

Each assembly 10 is equipped with a battery compartment 50 that holds at least one battery 52 providing power to the fan unit 26. Any type of battery 52 may be used, but it is recommended that a 12 Volt rechargeable battery be utilized to power the fan unit 26. Preferably, two 12 Volt rechargeable batteries, arranged in series, supply the appropriate amount of power to the fan unit 26. The battery 52 may be recharged via an electrical cord (not shown) that receives power from an external power source, and can either recharge the battery 52, or power the fan unit 26, if need be. The battery 52 is connected to the fan unit 26 by a power cord 54 of a known type.

At least one attachment strap 56 is positioned on the rear of the assembly 10. As illustrated in FIGS. 2 and 3, the attachment strap 56 is constructed in two separate sections. The first section is connected to the uppermost area of the back portion 14, and the second section is connected to the lowermost area of the back portion 14. Preferably, each section extends around opposite sides of a vehicle seat or headrest, until the sections are mated together to form a single, continuous attachment strap 56. A fastener 58 is used to mate the two sections together. The fastener 58 can include a multitude of various fasteners, but a hook and loop fastener (Velcro) is preferred for its durability and ease of use. Alternatively, the strap can be a single, continuous strap that is flexible, enabling the strap to fit securely around a vehicular seat to hold the assembly 10 in a desired position.

Alternatively, a headrest strap 60 may be employed, as shown in FIG. 3, to securely attach the assembly 10 to a vehicular headrest. The headrest strap 60 may be used separately or in conjunction with the attachment straps 56. As illustrated in FIG. 3, the headrest strap 60 is a continuous, circular arrangement that is designed to fit over the vehicular headrest. Preferably, the headrest strap 60 is made of a flexible material that can be expanded to fit over the headrest, and then self contracts to provide a tight, snug fit that will securely hold the assembly 10 in place. The headrest strap can also be configured much like the attachment straps 56, in a two section arrangement that are mated together by a fastener.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for providing a portable fan assembly on a vehicular seat surface in a spaced apart relationship to a child car seat comprising:
   providing a portable fan assembly, comprising:
      a front portion, a back portion, two side portions, a top portion, and a bottom portion;
      an interior void positioned centrally within the assembly, extending from the front portion to the back portion;
      a fan unit having a housing positioned within the interior void, the housing including a central hub and at least a pair of fan blades mounted to the hub, the hub being rotationally connected by an elongated shaft to a fan motor configured to be operative to rotate the fan blades to provide rotation movement of the fan blades and direct air through the interior void;
      wherein the portable fan assembly further comprises at least one storage holder composed of a fabric like material, wherein three of the sides are securely attached to the front portion of the portable fan assembly defining a pocket therein for storage of child related items;
      wherein the front portion, back portion, two side portions, the top portion, and the bottom portion are padded for providing a cushioning effect that prevents injury to a child situated in a spaced apart relationship to the assembly; and
      at least one attachment strap configured to securely position the assembly to a vehicular seat; and
   disposing the at least one attachment strap around a portion of the vehicular seat such that the portable fan assembly is in a spaced apart relationship to a child car seat.

2. The method according to claim 1, wherein the portable fan assembly further comprises a reflective surface positioned on the front portion of the portable fan assembly so as to reflect a view to a viewer.

3. The method according to claim 1, wherein the portable fan assembly further comprises at least one substantially transparent holder having four sides, wherein three of the sides are securely attached to the front portion of the portable fan assembly defining a top loading pocket therein for the insertion of a picture.

4. The method according to claim 1, wherein the portable fan assembly further comprises a flap composed of a fabric like material that is attached to the bottom portion of the portable fan assembly and extending substantially below the planar level of the portable fan assembly.

5. The method according to claim 1, wherein the portable fan assembly comprises flame retardant materials.

6. The method according to claim 1, wherein the portable fan assembly further comprises rechargeable batteries to supply power to the fan unit.

7. The method according to claim 1, wherein the portable fan assembly further comprises an electrical cord to provide power to the fan unit.

8. A method for providing a portable fan assembly on a vehicular seat surface in a spaced apart relationship to a child car seat comprising:
   providing a portable fan assembly, comprising:
      a front portion, a back portion, two side portions, a top portion, and a bottom portion;
      an interior void positioned centrally within the assembly, extending from the front portion to the back portion;
      a fan unit having a housing positioned within the interior void, the housing including a central hub and at least a pair of fan blades mounted to the hub, the hub being rotationally connected by an elongated shaft to a fan motor configured to be operative to rotate the fan blades to provide rotation movement of the fan blades and direct air through the interior void;
   wherein the potable fan assembly further comprises at least one holder composed of a fabric like material, wherein three of the sides are securely attached to the front portion of the portable fan assembly defining a top loading pocket therein for storage;

wherein the front portion, back portion, two side portions, the top portion, and the bottom portion are padded for providing a cushioning effect that prevents injury to a child situated in a spaced apart relationship to the assembly;

a protective grill located about the housing for prohibiting the intrusion of items into the fan blades, and wherein the protective grill is dimensioned to prevent a child's finger from contacting the fan blades;

at least one attachment strap configured to securely position the assembly to a vehicular seat; and a decorative design incorporated into the front portion of the assembly for increasing the aesthetic appeal of the assembly; and disposing the at least one attachment strap around a portion of the vehicular seat such that the portable fan assembly is in a spaced apart relationship to a child car seat.

9. The method according to claim 8, wherein the portable fan assembly further comprises a reflective surface positioned on the front portion of the portable fan assembly so as to reflect a view to a viewer.

10. The method according to claim 8, wherein the portable fan assembly further comprises at least one substantially transparent holder having four sides, wherein three of the sides are securely attached to the front portion of the portable fan assembly defining a top loading pocket therein for the insertion of a picture.

11. The method according to claim 8, wherein the portable fan assembly further comprises a flap composed of a fabric like material that is attached to the bottom portion of the portable fan assembly and extending substantially below the planar level of the portable fan assembly.

12. The method according to claim 8, wherein the portable fan assembly comprises flame retardant materials.

13. The method according to claim 8, wherein the portable fan assembly further comprises rechargeable batteries to supply power to the fan unit.

14. A method for providing a portable fan assembly on a vehicular seat surface in a spaced apart relationship to a child car seat comprising:

providing a portable fan assembly, comprising:

a front portion, a back portion, two side portions, a top portion, and a bottom portion;

an interior void positioned centrally within the assembly, extending from the front portion to the back portion;

a fan unit having a housing positioned within the interior void, the housing including a central hub and at least a pair of fan blades mounted to the hub, the hub being rotationally connected by an elongated shaft to a fan motor configured to be operative to rotate the fan blades to provide rotation movement of the fan blades and direct air through the interior void;

wherein the portable fan assembly further comprises at least one holder composed of a fabric like material, wherein three of the sides are securely attached to the front portion of the portable fan assembly defining a top loading pocket therein for storage;

wherein the fan blades comprise a resilient, flexible material for preventing injury to an item or body aperture that comes in contact with the fan blades during rotational movement, wherein the fan blades are substantially smaller than the assembly;

wherein the front portion, back portion, two side portions, the top portion, and the bottom portion are padded for providing a cushioning effect that prevents injury to a child situated in a spaced apart relationship to the assembly;

a protective grill located about the housing for prohibiting the intrusion of items into the fan blades, and wherein the protective grill is dimensioned to prevent a child's finger from contacting the fan blades;

at least one attachment strap configured to securely position the assembly to a vehicular seat; and a decorative design incorporated into the front portion of the assembly for increasing the aesthetic appeal of the assembly; and disposing the at least one attachment strap around a portion of the vehicular seat such that the portable fan assembly is in a spaced apart relationship to a child car seat.

15. The method according to claim 14, wherein the portable fan assembly further comprises a reflective surface positioned on the front portion of the portable fan assembly so as to reflect a view to a viewer.

16. The method according to claim 14, wherein the portable fan assembly further comprises at least one substantially transparent holder having four sides, wherein three of the sides are securely attached to the front portion of the portable fan assembly defining a top loading pocket therein for the insertion of a picture.

17. The method according to claim 14, wherein the portable fan assembly further comprises a flap composed of a fabric like material that is attached to the bottom portion of the portable fan assembly and extending substantially below the planar level of the portable fan assembly.

* * * * *